United States Patent [19]
Kordesch et al.

[11] 3,880,671
[45] Apr. 29, 1975

[54] CORROSION INHIBITOR SYSTEM FOR ALKALINE ALUMINUM CELLS

[75] Inventors: Karl V. Kordesch, Lakewood; Akiya Kozawa, Middleburg Heights, both of Ohio

[73] Assignee: Union Carbide Corporation, New York, N.Y.

[22] Filed: Oct. 26, 1972

[21] Appl. No.: 301,110

[52] U.S. Cl. .............................. 136/100 R; 136/154
[51] Int. Cl. ........................................... H01m 11/00
[58] Field of Search .......... 136/86 A, 20, 83 R, 154, 136/100 R; 252/396, 389 R; 204/45 R, 58

[56] References Cited
UNITED STATES PATENTS

| | | | |
|---|---|---|---|
| 1,675,828 | 7/1928 | Siegmund | 136/154 X |
| 2,018,563 | 10/1935 | Martus | 136/154 X |
| 3,043,898 | 7/1963 | Miller | 136/86 |
| 3,563,803 | 2/1971 | Katoh | 136/86 A |

OTHER PUBLICATIONS
Horiguchi, K. et al., Denki Kagaku, 34(11), 911–913, (1966), (Japan).

*Primary Examiner*—Winston A. Douglas
*Assistant Examiner*—John F. Niebling
*Attorney, Agent, or Firm*—John R. Doherty

[57] ABSTRACT

The aluminum electrodes in alkaline aluminum galvanic cells are inhibited against corrosion while the cell is on open circuit or while the cell is being operated at very low discharge current, by an inhibitor system comprising an alkali metal citrate plus a lead compound, a tin compound, or both a lead compound and a tin compound.

15 Claims, 6 Drawing Figures

Electrolyte: 6 M KOH

Electrolyte: 6 M KOH + 0.066 M K stannate + 0.062 M K citrate

Electrolyte: 6 M KOH + 0.075 M Na stannate

Electrolyte: 6 M KOH + 0.062 M K citrate + 0.053 M Pb acetate

CORROSION INHIBITOR SYSTEM FOR ALKALINE ALUMINUM CELLS

The invention relates to a corrosion inhibitor system for an alkaline aluminum galvanic cell.

The use of aluminum electrodes in cells employing alkaline electrolytes under limited conditions has been reported. For example, see Zaromb, U.S. Pat. No. 3,554,810, J. Electrochem. Soc. 109, No. 12, 1125 (1962), and ibid 109, No. 12, 1191 (1962); Zaromb et al., ibid 110, No. 4, 267 (1963); and Katoh, U.S. Pat. No. 3,563,803. One of the problems encountered when aluminum electrodes are employed in alkaline cells is corrosion of the aluminum, especially when the cell is on open circuit or when it is discharging at a low rate such that the current density on the aluminum electrode is below about 20 milliamperes per square centimeter. This corrosion problem has prevented the wide commercial use of alkaline aluminum cells.

It has been proposed to employ certain inhibitors in the alkaline electrolyte as a means for controlling the above-discussed corrosion problem. For instance, in U.S. Pat. No. 3,563,803, Katoh has proposed the use of plumbites, plumbates, or stannates in the electrolyte. The present invention is based on the discovery that an inhibitor system including an alkali metal citrate plus a lead compound or a tin compound or both a lead compound and a tin compound provides more effective and practical corrosion inhibition for alkaline aluminum galvanic cells when the cells are on open circuit and when they are discharging (at both low and high rates of discharge), than the corrosion inhibitor systems heretofore proposed. Accordingly, it is an object of this invention to provide a corrosion inhibitor system for use in alkaline aluminum galvanic cells to inhibit wasteful corrosion of the aluminum electrode, both when the cell is on open circuit and when it is discharging.

This and other objects of the invention are accomplished by the provision of a corrosion inhibitor system for alkaline aluminum galvanic cells, which system comprises an alkali metal citrate plus either a lead compound, a tin compound, or both a lead and a tin compound.

The principles of the invention will be described in detail hereinafter with reference to the accompanying drawings, wherein.

Figure 1:
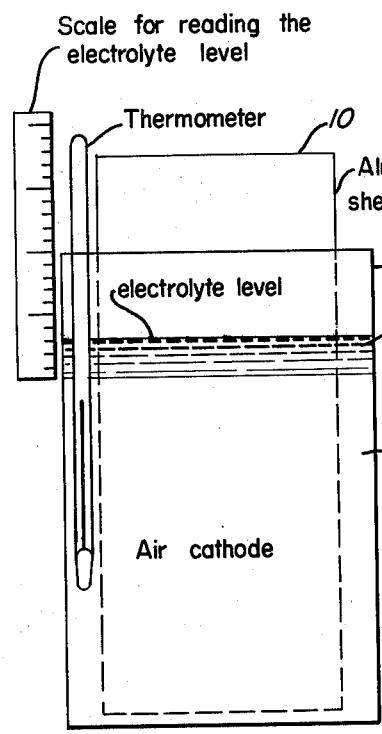
FIG. 1 is a cut-away front elevations view of one type of cell which embodies the principles of the invention.
Figure 2:
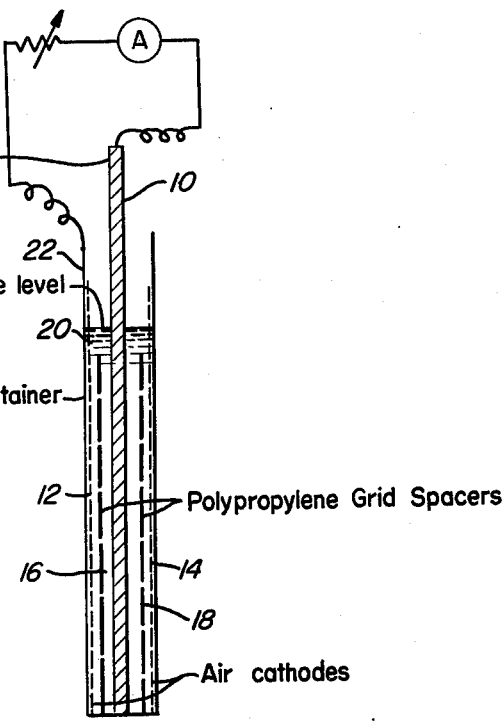
FIG. 2 is a partially schematic sectional side view of the cell of FIG. 1.
Figure 3:
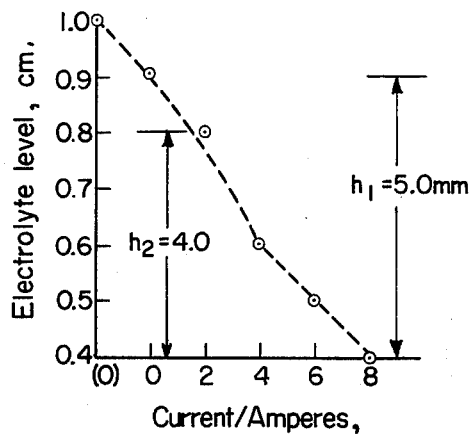
FIGS. 3-6 are graphs on which electrolyte levels are plotted versus current for the cell of FIGS. 1 and 2, with four different electrolytes.
Figure 5:
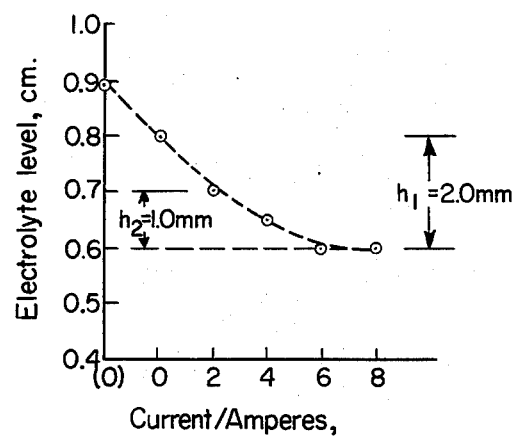
Figure 4:
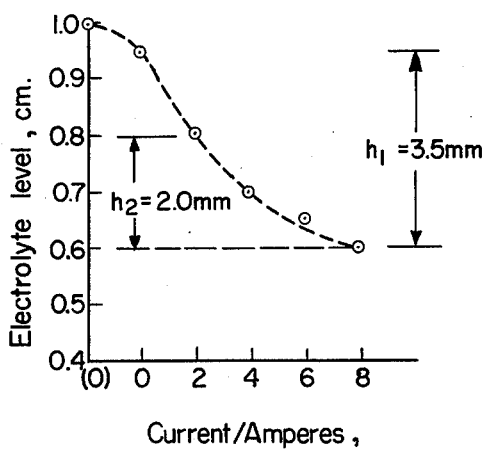
Figure 6:
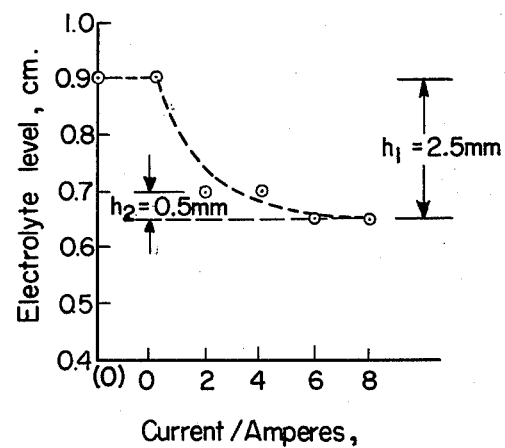

In FIGS. 1 and 2, an aluminum-air cell is shown. The cell includes an aluminum sheet 10 as the anode, two air electrodes 12 and 14, and polypropylene grid spacers 16 and 18. The cell also includes aqueous alkali metal hydroxide electrolyte 20, which contains the corrosion inhibitor system of the invention. The cell container 22 is made of a material that is inert to the electrolyte, such as polymethyl methacrylate plastic.

The corrosion inhibitor system of the invention is applicable to known types of alkaline aluminum cells. In such cells, the anode is preferably made of aluminum having a purity of at least 99.99 per cent. The electrolyte is aqueous alkali, e.g., sodium hydroxide or potassium hydroxide, preferably potassium hydroxide, in concentrations of from about 4N to about 9N.

The preferred cathode is an oxygen-depolarized electrode, often referred to as an air electrode. The air electrode can be any of the types that are known in the art, for instance, the air electrode can be a porous activated carbon plate, a phenolic resin-bonded carbon plate, or a thin, flat, plastic-bonded carbon plate of the fixed zone type as disclosed by Darland et al. in U.S. Pat. No. 3,423,247. The air electrode can also be constructed of a sintered metal such as sintered nickel or silver. Customary air electrode catalysts can be used, such as $Al_2O_3$ CoO spinel, silver, noble metals, and ferric phthalocyanine. The preferred air electrode is a thin, flat, plastic-bonded carbon electrode of the fixed zone type employing ferric phthalocyanine catalyst. Other cathodes, such as manganese dioxide cathodes, can also be used in the cell.

The corrosion inhibitor system of the invention includes an alkali metal citrate such as sodium citrate or preferably, potassium citrate. The system also includes either a lead compound, a tin compound, or both. Illustrative lead compounds which can be employed include alkali metal (e.g., sodium or potassium) plumbites and plumbates, lead oxide, and lead acetate. Illustrative tin compounds include alkali metal (e.g., sodium or potassium) stannates and tin oxide. The preferred compounds for use in the corrosion inhibitor system of the invention are potassium citrate, lead acetate, and potassium stannate.

The corrosion inhibitor compounds are employed in amounts effective to inhibit corrosion of the aluminum electrode in alkaline aluminum galvanic cells when the cell is on open circuit and when the cell is discharging at a rate such that the current density on the aluminum electrode is below about 20 milliamperes per square centimeter. (Corrosion inhibition at higher discharge rates is also obtained, although corrosion is less of a problem at higher discharge rates.) As an illustration of the effective amounts of the corrosion inhibitors, the alkali metal citrate can be employed in the electrolyte in an amount within the range of from about 0.5 per cent to about 10 per cent, and preferably from about 0.5 per cent to about 2 per cent. The tin compound can be employed in the electrolyte in amounts of from about 0.5 per cent to about 5 per cent, and preferably from about 0.5 per cent to about 2 per cent. The lead compound can be employed in amounts of from about 0.1 per cent to about 2 per cent, and preferably from about 0.5 per cent to about 2 per cent, as lead. All percentages are based on weight of electrolyte.

Alkaline aluminum cells inhibited against corrosion in accordance with the invention are particularly useful as reserve cells of high ampere-hour capacity.

The Examples set forth below illustrate the invention.

EXAMPLE 1

Utilization Test

Using a pure aluminum (99.99%) sheet (5 cm × 15 cm × 2.0 mm) as the anode, and two 7 cm × 6.5 cm × 1 mm fixed zone, plastic-bonded carbon air cathodes, various aqueous electrolytes (shown below in Table I) were tested in a box type aluminum-air cell (shown in FIGS. 1 and 2). The total area of the aluminum anode that was in contact with the electrolyte was 80 square centimeters. The cell was operated at a constant current (4.0 amperes) for 2 hours and the weight decrease of the aluminum anode was measured. The utilization (%) shown in Table I was calculated from the weight loss based on the three-electron process (Al → Al$^{+3}$ + 3e$^-$). It should be noted that in pure 6 M KOH (no additives), the cell temperature rose to 45°C. within 20 minutes. Once the cell temperature exceeded 45°C., the anode corrosion became uncontrollably heavy and hydrogen evolution was so violent that it was impossible to continue cell operation. When the electrolyte contained additives which were effective in reducing the anode corrosion, the cell temperature stayed at about 35°–40°C. at 4 amperes (cathode: about 50 mA/cm$^2$; anode: about 50 mA/cm$^2$) during the 2-hour operation.

Five grams of additive is equivalent to 1.6 weight per cent, based on weight of electrolyte, when added to 250 milliliters of 6 M aqueous KOH.

Electrolyte: 50 cc of 6 M aqueous KOH with or without additives.

Procedure: At 24°C. (room temperature), the cell was filled with electrolyte. A constant current of 4.0 amps was passed for 10 to 12 minutes until the cell electrolyte temperature reached 40°C. or a stable lower temperature level. Then the circuit was open and the electrolyte level was read (recorded as current (O) in FIGS. 3–6). Another reading was taken 30–60 seconds later (recorded as current O in FIGS. 3–6). The current was then increased stepwise to 2, 4, 6 and 8 amperes, and the electrolyte level at each current was measured. In order to obtain a series of consistent measurements at 40°±1°C., the level reading was always made 30–40 seconds after adjusting the current.

The results are shown in FIGS. 3–6 for the following four solutions, wherein each inhibitor additive was used

TABLE I

| Electrolyte | Base Solution 6 M KOH | Na stannate | K stannate | K citrate | Pb acetate | *Temp. (°C.) | Utilization** (%) |
|---|---|---|---|---|---|---|---|
| No. 1 | 250 ml | | | | | >46 | |
| 2 | 250 ml | 5 g | | | | 37.5 | 87.5 |
| 3 | 250 ml | | 5 g | | | {35, 37} | {90.2, 93} |
| 4 | 250 ml | | | | 5 g | 39 | 74 |
| 5 | 250 ml | | | 5 g | | >46 | |
| 6 | 250 ml | | 5 g | 5 g | | 35 | 103 |
| 7 | 250 ml | | | 5 g | 0.5 g | 36 | 90 |

Sodium stannate  Na$_2$SnO$_3$.3H$_2$O
Potassium stannate  K$_2$SnO$_3$.3H$_2$O
Potassium citrate  K$_3$C$_6$H$_5$O$_7$.H$_2$O
Lead acetate  Pb(C$_2$H$_3$O$_2$)$_2$.3H$_2$O

*at the end of 2 hours' operation.
**after 2 hours' continuous operation at about 50 mA/cm$^2$ anode current density.

It is evident from the utilization values shown in Table I that a combination of potassium citrate and potassium stannate is significantly better than each component alone (compare electrolytes No. 3, 5 and 6). A combination of lead acetate and potassium citrate (electrolyte No. 7 in Table I) also produced utilization better than either component alone (electrolytes 4 and 5).

These tests demonstrate the effectiveness of the inhibitor system of this invention is significantly reducing wasteful aluminum corrosion during cell operation, and in substantially increasing the efficiency of utilization of the aluminum anode.

EXAMPLE 2

Anode Corrosion at Various Current Densities

It is known that, at the aluminum anode, electrochemical utilization becomes higher at higher current densities; that is, wasteful corrosion is reduced at higher current densities.

The electrolyte level in the cell described above in Example 1 was used to estimate the degree of anode corrosion at various current densities. The electrolyte level becomes higher as the degree of wasteful corrosion becomes higher, since vigorous hydrogen gas evolution raises the electrolyte level. Therefore, a change in the electrolyte level can be employed as an approximate measure of the degree of wasteful corrosion of the aluminum anode.

The experimental procedure was:

in proportions of 1.6 weight per cent, based on weight of electrolyte:

a. 6 M KOH
b. 6 M KOH + 0.075 M sodium stannate
c. 6 M KOH + 0.066 M potassium stannate + 0.062 M potassium citrate
d. 6 M KOH + 0.062 M potassium citrate + 0.053 M lead acetate It is evident that in any of the above solutions, the electrolyte level decreases with increasing current. In FIGS. 3–6, $h_1$ represents the difference between the electrolyte levels at 0 and 8 amperes per cell, and is a rough measure of the hydrogen gas evolution due to aluminum anode corrosion on open circuit, since at 8 amperes very little gas was evolved except in solution (a). In solutions (c) and (d), practically no hydrogen gas was evolved at 6 amperes or greater. In solution (a), even at 8 amperes, the amount of gas evolved was considerable. The difference in the electrolyte levels at 2 and 8 amperes is represented by $h_2$. It should be noted that the $h_2$ values of solutions (c) and (d) are smaller than those for solutions (a) and (b). This indicates that addition to the electrolyte of potassium citrate plus either potassium stannate or lead acetate considerably reduces the aluminum corrosion during cell operation, when compared with the addition of potassium stannate alone.

What is claimed is:

1. A galvanic cell comprising an aluminum anode, a cathode, and an electrolyte in contact with said anode and said cathode, said electrolyte comprising an aqueous solution of an alkali metal hydroxide and a corrosion inhibitor system in an amount effective to inhibit corrosion of said aluminum anode when said cell is on open circuit and when said cell is discharging, said corrosion inhibitor system comprising (a) an alkali metal citrate, and (b) at least one compound selected from the group consisting of lead compounds and tin compounds.

2. The galvanic cell of claim 1 wherein said alkali metal hydroxide is potassium hydroxide.

3. The galvanic cell of claim 1 wherein the lead compounds are selected from the group consisting of alkali metal plumbites, alkali metal plumbates, lead oxide, and lead acetate, and wherein the tin compounds are selected from the group consisting of alkali metal stannates and tin oxide.

4. The galvanic cell of claim 2 wherein the lead compounds are selected from the group consisting of alkali metal plumbites, alkali metal plumbates, lead oxide, and lead acetate, and wherein the tin compounds are selected from the group consisting of alkali metal stannates and tin oxide.

5. The galvanic cell of claim 1 wherein the corrosion inhibitor system is potassium citrate plus at least one number selected from the group consisting of lead acetate and potassium stannate.

6. The galvanic cell of claim 2 wherein the corrosion inhibitor system is potassium citrate plus at least one number selected from the group consisting of lead acetate and potassium stannate.

7. The galvanic cell of claim 1 wherein the alkali metal citrate is employed in the electrolyte in an amount within the range of from about 0.5 to about 10 weight per cent, wherein the tin compound is employed in the electrolyte in an amount within the range of from about 0.5 to about 5 weight per cent, and wherein the lead compound is employed in the electrolyte in an amount within the range of from about 0.1 to about 2 weight per cent, all percentages being based upon weight of electrolyte.

8. The galvanic cell of claim 2 wherein the alkali metal citrate is employed in the electrolyte in an amount within the range of from about 0.5 to about 10 weight per cent, wherein the tin compound is employed in the electrolyte in an amount within the range of from about 0.5 to about 5 weight per cent, and wherein the lead compound is employed in the electrolyte in an amount within the range of from about 0.1 to about 2 weight per cent, all percentages being based upon weight of electrolyte.

9. The galvanic cell of claim 3 wherein the alkali metal citrate is employed in the electrolyte in an amount within the range of from about 0.5 to about 10 weight per cent, wherein the tin compound is employed in the electrolyte in an amount within the range of from about 0.5 to about 5 weight per cent, and wherein the lead compound is employed in the electrolyte in an amount within the range of from about 0.1 to about 2 weight per cent, all percentages being based upon weight of electrolyte.

10. The galvanic cell of claim 4 wherein the alkali metal citrate is employed in the electrolyte in an amount within the range of from about 0.5 to about 10 weight per cent, wherein the tin compound is employed in the electrolyte in an amount within the range of from about 0.5 to about 5 weight per cent, and wherein the lead compound is employed in the electrolyte in an amount within the range of from about 0.1 to about 2 weight per cent, all percentages being based upon weight of electrolyte.

11. The galvanic cell of claim 5 wherein said potassium citrate is employed in said electrolyte in an amount within the range of from about 0.5 to about 2 weight per cent, wherein said potassium stannate is employed in said electrolyte in an amount within the range of from about 0.5 to about 2 weight per cent, and wherein said lead acetate is employed in said electrolyte in an amount within the range of from about 0.5 to about 2 weight per cent, all percentages being based on said electrolyte.

12. The galvanic cell of claim 11 wherein said alkali metal hydroxide is potassium hydroxide.

13. The galvanic cell of claim 1 wherein the cathode is an oxygen-depolarized cathode.

14. The galvanic cell of claim 2 wherein the cathode is an oxygen-depolarized cathode.

15. A galvanic cell comprising an aluminum anode, a cathode, and an electrolyte in contact with said anode and said cathode, said electrolyte comprising an aqueous solution of an alkali metal hydroxide and a corrosion inhibitor system comprising (a) an alkali metal citrate selected from the group consisting of sodium citrate and potassium citrate, in an amount within the range of from about 0.5 to about 10 weight per cent, and (b) at least one compound selected from the group consisting of lead compounds in an amount within the range of from about 0.1 to about 2 weight per cent, and tin compounds in an amount within the range of from about 0.5 to about 5 weight per cent, all percentages being based upon weight of electrolyte.

* * * * *